(12) United States Patent
Kemle et al.

(10) Patent No.: US 6,659,858 B2
(45) Date of Patent: Dec. 9, 2003

(54) METHOD AND ARRANGEMENT FOR REGULATING AIR MIXING IN A HEATING OR AIR CONDITIONING SYSTEM OF A MOTOR VEHICLE

(75) Inventors: Andreas Kemle, Bietigheim-Bissingen (DE); Thorsten Moellert, Leonberg (DE); Harald Riegel, Stuttgart (DE); Gebhard Schweizer, Leonberg (DE)

(73) Assignee: Behr GmbH & Co., Stuttgart (DE)

( * ) Notice: Subject to any disclaimer, the term of this patent is extended or adjusted under 35 U.S.C. 154(b) by 0 days.

(21) Appl. No.: 10/045,012

(22) Filed: Jan. 15, 2002

(65) Prior Publication Data

US 2002/0115405 A1 Aug. 22, 2002

(30) Foreign Application Priority Data

Jan. 15, 2001 (DE) .......................... 101 01 700

(51) Int. Cl.$^7$ ................................................ B60S 1/54
(52) U.S. Cl. ....................................... 454/121; 454/126
(58) Field of Search .............................. 454/121, 139, 454/256, 229

(56) References Cited

U.S. PATENT DOCUMENTS

| | | | | |
|---|---|---|---|---|
| 4,408,660 A | * | 10/1983 | Sutoh et al. ............. | 165/202 |
| 4,424,933 A | * | 1/1984 | Sutoh et al. ............. | 236/44 A |
| 4,437,391 A | * | 3/1984 | Eguchi et al. ............ | 454/75 |
| 4,519,443 A | * | 5/1985 | Sutoh et al. ............. | 165/204 |
| 4,881,456 A | * | 11/1989 | Yasuda et al. ........... | 454/75 |
| 4,917,293 A | * | 4/1990 | Fedter et al. ............ | 236/49.3 |
| 4,932,588 A | * | 6/1990 | Fedter et al. ............ | 236/44 R |
| 5,181,553 A | * | 1/1993 | Doi ....................... | 165/203 |
| 5,725,048 A | * | 3/1998 | Burk et al. .............. | 165/42 |
| 5,934,987 A |   | 8/1999 | Baruschke et al. ...... | 454/75 |
| 5,937,940 A | * | 8/1999 | Davis et al. ............. | 165/202 |
| 5,971,287 A |   | 10/1999 | Kettner et al. .......... | 236/44 A |
| 6,059,027 A | * | 5/2000 | Lake et al. .............. | 165/204 |

FOREIGN PATENT DOCUMENTS

| | | |
|---|---|---|
| DE | 40 31 050 | 4/1991 |
| DE | 196 32 059 | 2/1998 |
| DE | 196 37 232 | 3/1998 |

\* cited by examiner

Primary Examiner—Derek Boles
(74) Attorney, Agent, or Firm—Foley & Lardner

(57) ABSTRACT

The invention relates to a method and an arrangement for regulating air mixing in a heating and/or air-conditioning system of a motor vehicle. In the system, recirculated air and/or fresh air is/are distributed via air-flow control elements to different air vents and supplied to the passenger compartment. In order to optimize energy consumption and provide a simpler and therefore more cost effective arrangement, the proportion of recirculated air is determined as a function of the position of the air-flow control element(s). The control unit is designed in such a manner, e.g., by implementation of a computer program, that signals being emitted by the control unit for opening the recirculated-air intake opening are dependent on, inter alia, the position(s) of the air-flow control element(s).

16 Claims, 4 Drawing Sheets

METHOD AND ARRANGEMENT FOR REGULATING AIR MIXING IN A HEATING OR AIR CONDITIONING SYSTEM OF A MOTOR VEHICLE

CROSS-REFERENCE TO RELATED PATENT APPLICATIONS

The right of priority under 35 U.S.C. §119(a) is claimed based on German Patent Application No. 101 01 700.6, filed Feb. 15, 2001, the disclosure of which is hereby incorporated by reference.

BACKGROUND OF THE INVENTION

The present invention relates to a method and arrangement for regulating air mixing in a heating and/or air-conditioning system of a motor vehicle.

DE 196 32 059 A1 discloses an air-conditioning system and a method for operating the air-conditioning system, in which recirculated air is added, as required, to fresh air supplied in order to optimize the energy consumption of the air-conditioning system. Depending on the time of year and on settings of the air-conditioning system, the recirculated air is already partly cooled or heated, and accordingly energy can therefore be saved by adding recirculated air because the feed air mix is thereby precooled or preheated to some extent. The recirculated air generally has a higher moisture content, mainly because of the emission of moisture by the vehicle occupants. Consequently, according to DE 196 32 059 A1, moisture sensors for determining the humidity of the air in the passenger compartment are provided, so that the humidity of the air mix supplied to the passenger compartment remains limited by limiting the amount of recirculated air that is added to the input air stream.

A disadvantage of this method is that recirculated air is continuously added, even if not necessary, and as a result the humidity of the air mix is essentially always at the upper limit value. In addition, in order to carry out this known method, a number of temperature and humidity sensors are necessary, which result in additional costs.

SUMMARY OF THE INVENTION

One principal object of the present invention is to provide for further optimizing of the energy consumption in an automotive heating/air-conditioning system. A further object of the invention is to provide a method and apparatus configured in a simpler manner and permitting a simpler and therefore more cost-effective arrangement for regulating the amount of air mixing.

In accordance with one aspect of the present invention, there has been provided a method for regulating air mixing in a heating and/or air-conditioning system of a motor vehicle having a passenger compartment, comprising: supplying at least one of recirculated air and fresh air to an air-guiding housing; conditioning the supplied air in the housing; distributing conditioned air to different locations in the passenger compartment by means of air-flow control elements; and controlling the proportion of recirculated air supplied as a function of the position of at least one of the air-flow control elements.

In accordance with another aspect of the invention, there is provided an arrangement for regulating air mixing in a heating and/or air-conditioning system of a motor vehicle having a passenger compartment, comprising: an air-guiding housing having at least one recirculated-air intake opening and at least one fresh-air intake opening; an intake air control element for selectively supplying at least one of recirculated air and fresh air to the housing; a fan and at least one heat exchanger positioned in the housing for conditioning the supplied air; a plurality of distributing air-flow control elements for distributing conditioned air from the housing to different locations in the passenger compartment; and a control unit for controlling the proportion of recirculated air supplied by the intake air-flow control element as a function of the position of at least one of the distribution air-flow control elements.

Further objects, features and advantages of the present invention will become apparent from the detailed description of preferred embodiments that follows, when considered together with the accompanying figures of drawing.

DETAILED DESCRIPTION OF PREFERRED EMBODIMENTS

Figure 1:
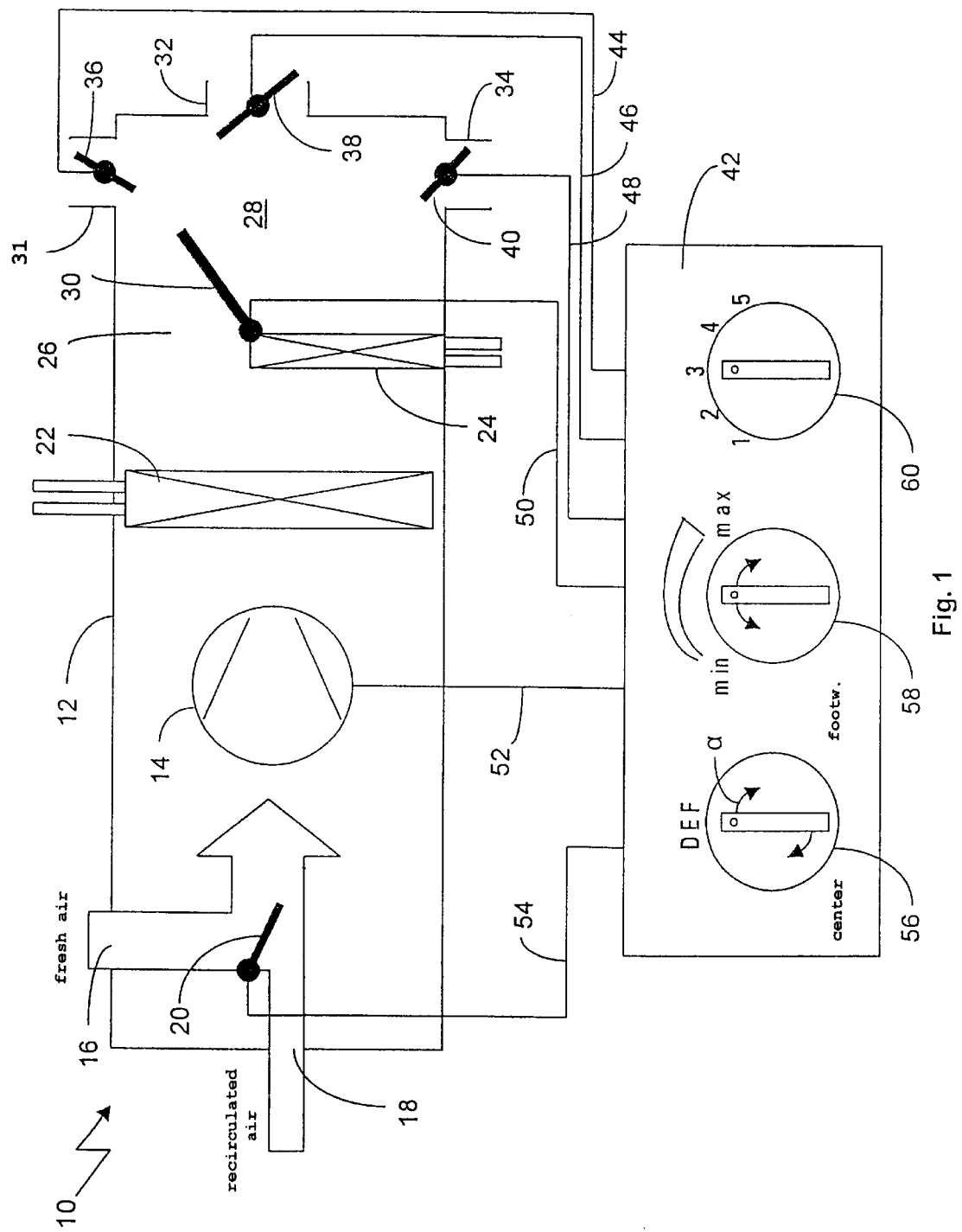
FIG. 1 is a schematic illustration of an arrangement according to the invention for regulating air mixing in a heating or air-conditioning system.

According to the method of the invention, the proportion of recirculated air is determined as a function of the position of the air-flow control elements that are used for distributing the conditioned air. It is therefore ensured that, in certain air-distributing modes, a maximum permissible proportion of recirculated air is admixed, and, that in other modes, for example, in a defrosting mode, exclusively fresh air is supplied. No additional temperature or moisture sensors are required, and recirculated air is only added if a higher moisture content in the vehicle passenger compartment is possible.

During cold starting, admixing recirculated air enables not only the vehicle passenger compartment to be heated more rapidly, but also enables the engine coolant to be heated more rapidly, which improves fuel efficiency.

According to another advantageous aspect of the invention, when setting the air-flow control elements in a defrosting mode, the supply of recirculated air is completely blocked, since the air supplied to the passenger compartment should be as dry as possible when defrosting the windshield.

The maximum permissible proportion of recirculated air can be fixed at a predetermined level, for example, at 30%. This is preferably set when most of the conditioned air is guided to the footwell vents and/or to central vents (or else referred to as person-specific blower nozzles) arranged in the central region of the vehicle. The maximum proportion can advantageously be selected as a function of certain parameters. These parameters are, for example, the number of vehicle occupants, with the result that the proportion of recirculated air is smaller in a fully occupied vehicle, in order to take into consideration the higher level of moisture introduced into the passenger compartment by the vehicle occupants. The maximum proportion of recirculated air can also be set in a country-specific manner, so that the maximum proportion of recirculated air is set as a function of the country into which the vehicle is sold.

Furthermore, it is advantageous to regulate the proportion of recirculated air as a function of a prescribable heater output by, for example, limiting the addition of recirculated air to the range between only 80 and 100% of the maximum output. One result is that energy is saved at maximum heating by the admixture of recirculated air, which has already been heated to some extent. There is no risk here of the windows becoming fogged, since warmer air can contain a higher moisture content, and there is no risk of fogging at full heater output. A heater output of between 80 and 100% is generally necessary only at the beginning of a journey, after cold starting, and so the measure according to the invention enables the passenger compartment to be heated up more rapidly. If the vehicle and engine have already been heated up, the heater output will, as a rule, be less than 80% of the maximum output. It is then recommended to exclusively supply fresh air, which enables the passenger compartment of the vehicle to be dehumidified.

It is also advantageous to avoid supplying any recirculated air at a small fan output, since otherwise fresh air could pass untreated, directly via the recirculated-air duct, into the vehicle passenger compartment, as a result of the stagnation pressure present in the fresh-air duct during the journey. As the fan output increases, the proportion of recirculated air can also be increased.

Since the stagnation pressure is dependent on the driving speed, the proportion of recirculated air can advantageously be regulated also as the function of the vehicle speed. At a low speed, and therefore low stagnation pressure, some recirculated air can be safely admixed, even at a small fan output.

An arrangement for carrying out the method advantageously has a control unit which is designed in such a manner that signals being emitted by the control unit for opening the recirculated-air intake opening are dependent on the positions of the air-flow control elements. This control unit preferably includes a microprocessor having an appropriate computer program for controlling the air-flow control elements and the recirculated-air/fresh-air flap or flaps.

The invention will be explained in detail below with reference to several exemplary embodiments and to the drawings.

An arrangement 10 according to the invention for regulating air mixing in a heating or air-conditioning system of a motor vehicle has an air-guiding housing 12 of an air-conditioning unit. The air-guiding housing 12 contains a fan 14 to which fresh air can be supplied via a fresh-air opening 16 and/or recirculated-air can be supplied via a recirculated-air opening 18. An air-flow control element 20, for example, a fresh-air/recirculated-air flap, serves for regulating the proportion of fresh air to recirculated air, which proportion can be set in each case depending on the flap position. Instead of the fresh-air/recirculated-air flap 20, there could also be provided two individual air flaps which can respectively close the fresh-air opening 16 and the recirculated-air opening 18.

The air taken in by the fan 14 is guided in the air-guiding housing 12 through a cooling heat exchanger 22, for example, an evaporator, of a refrigerant circuit, and is cooled therein. A heating heat exchanger 24 in which the air can be heated is arranged on the downstream side of the cooling heat exchanger 22. A cold-air bypass 26 is provided parallel to the heating heat exchanger 24, and by means of this bypass cold air can be guided past the heating heat exchanger 24 into a cold-air/warm-air mixing chamber 28. The proportion of cold air to warm air, and therefore the air temperature in the air-mixing chamber 28, can be set via a temperature mixing flap 30.

As an alternative, instead of the air temperature regulation which is described, engine coolant (water) regulation could also be provided. In this case the air passes continuously through the heating heat exchanger, i.e., there is no cold-air bypass, and, in order to regulate the temperature, the water throughput through the heating heat exchanger can be regulated by an appropriate valve.

Several ducts branch off from the air-mixing chamber 28, including a defrosting-air duct 31, a ventilating duct 32 and a footwell air duct 34. These can be closed via the corresponding defrosting-air flap 36, ventilating flap 38 and footwell air flap 40. The air is guided via the air ducts 31, 32 and 34 to air nozzles arranged in the vehicle passenger compartment, such as defrosting nozzles, central vents and footwell vents, according to the usual practice and in accordance with the design of individual vehicle models.

All of the flaps of the air-conditioning unit and the fan 14 can be controlled via a control unit 42 and can be connected to the latter via signal lines 44, 46, 48, 50, 52 and 54. In a typical embodiment, the control unit 42 has, for example, three operating elements 56, 58 and 60, which are preferably arranged in the dashboard and with which specific instructions can be set. In the exemplary embodiment illustrated, the operating element 56 is designed as an air-distributing switch or flap switch, the operating element 58 is designed as a temperature selection switch, and the operating element 60 is designed as a fan output switch.

The control unit 42 preferably contains a microcomputer for activating the individual air flaps and the fan in accordance with the settings on the operating elements 56, 58, 60. The air flaps themselves can be adjusted via stepping motors (not illustrated), as is conventional.

The method according to the invention, which is implemented, for example, as a computer program in the control unit 42, operates as follows.

Figure 2:
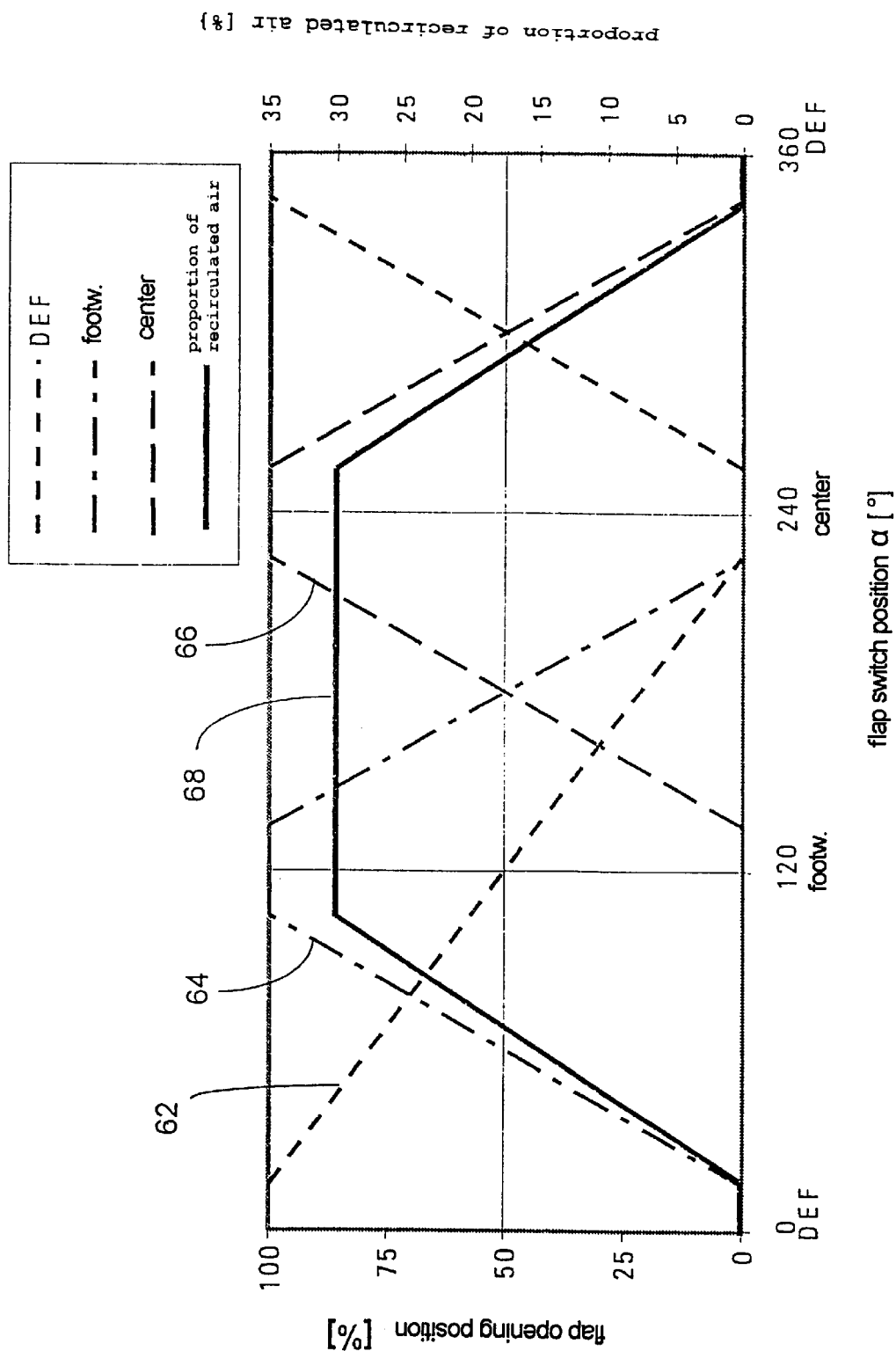
FIGS. 2 to 4 are diagrams representing the proportion of recirculated air as a function of various parameters.

FIG. 2 depicts, among other things, a representative flap program for a vehicle air-conditioning system as illustrated in FIG. 1. At a flap operating switch position of α=0°, as illustrated in FIG. 1 on the operating switch 56, a defrosting mode "DEF", for example, may be set. In this defrosting mode, the defrosting-air flap 36 is completely opened, and the footwell air flap 40 and ventilating-air flap 38 are completely closed. Starting from this flap position, if the flap operating switch 56 is rotated, the defrosting-air flap 36 is slowly closed, in accordance with the dashed line 62, and the footwell air flap 40 is slowly opened, in accordance with the dash-dotted line 64, until the flap operating switch 56 has covered approximately one third of a complete rotation (α=120°) and an air-distributing mode footwell "footw." is reached. In this position of switch 56, the footwell air flap 40 is completely opened, and most of the air is therefore guided into the footwell. On further rotation of the flap operating switch 56, the footwell air flap 40 is again closed and the defrosting-air flap 36 closed further. At the same time, the ventilating-air flap 38 is opened until the angle a is approximately 240°, in which position the ventilating-air flap 38 is now completely opened and the two other air flaps 38 and 40 are completely closed. This results in all of the air being guided for ventilating purposes through the central vents into the vehicle passenger compartment. This position of the flap operating switch 56 is referred to in FIG. 1 by "center". On further rotation of the flap operating switch 56, the defrosting-air mode "DEF" is again slowly approached, and the ventilating flap 38 is closed and the defrosting-air flap 36 is slowly opened. The footwell air flap 40 remains closed until α=360°, where the starting position has again been reached.

According to the invention, the proportion of recirculated air is determined as a function of the position of the individual air-flow control elements 36, 38 and 40, as is illustrated, for example, with reference to the line 68 in FIG. 2. The line 68 indicates the proportion of recirculated air in %, with the scale on the right-hand side of the diagram corresponding to the line 68. Therefore, in the defrost mode "DEF" no recirculated air is admixed with the air taken in, and in the footwell mode "footw." ($\alpha=120°$) and in the ventilating mode "center" ($=240°$) a maximum proportion of recirculated air of, for example, 30% is set. Between the defrost mode and the footwell mode, the proportion of recirculated air is continuously increased, and starting from the ventilating mode is continuously reduced when setting the defrost mode.

In other embodiments, the maximum proportion of recirculated air which, in FIG. 2, is approximately 30%, can be set as a function of various parameters. For example, the proportion of recirculated air can be reduced if there are a number of vehicle occupants in the vehicle, which may, for example, be ascertained automatically by seat occupation sensors that are operatively connected to the control unit, e.g., via signal lines.

Figure 3:
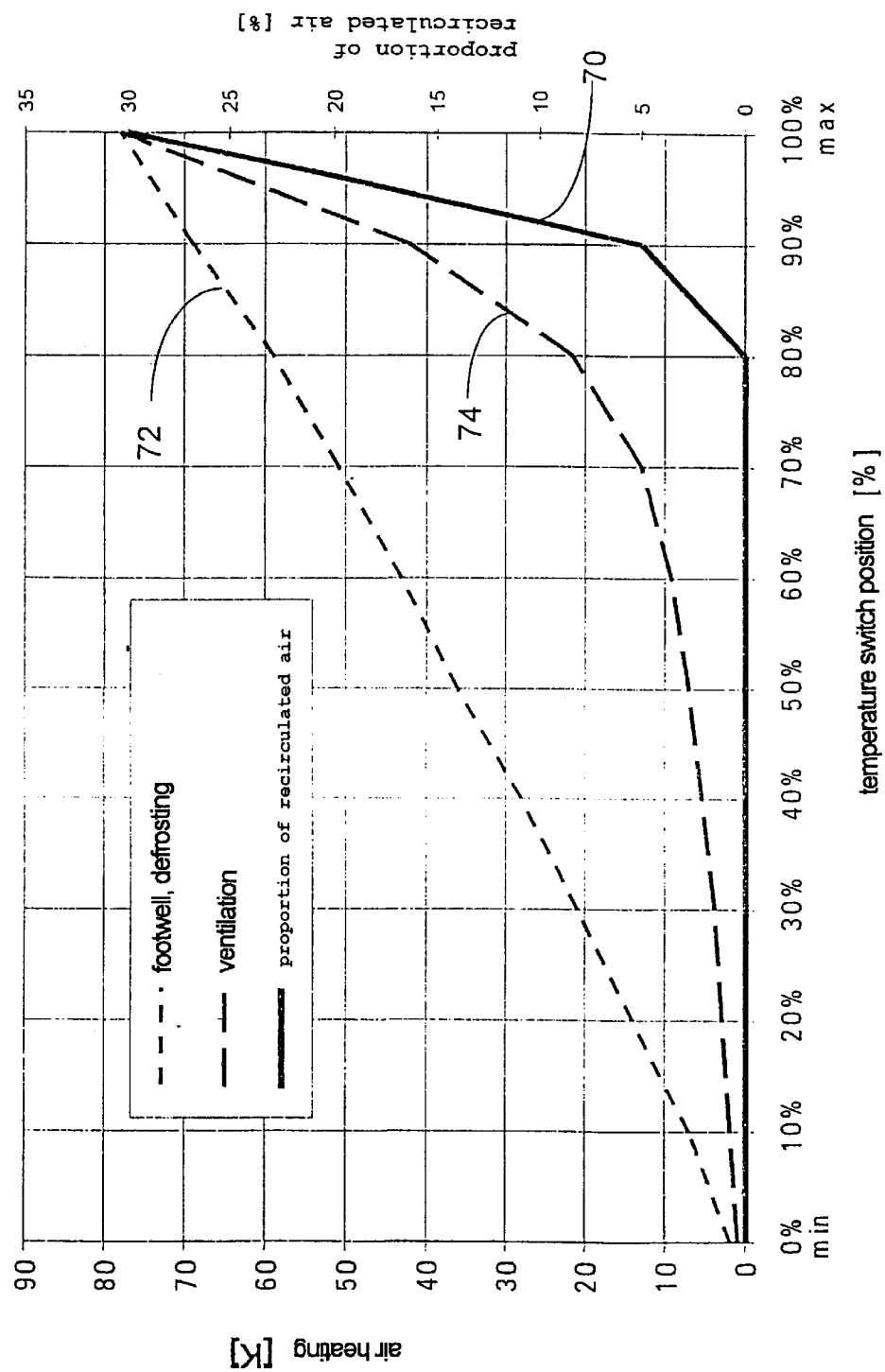

Furthermore, the proportion of recirculated air can be additionally regulated as a function of the heater output. If the temperature switch 58 is set to maximum coldness "min", corresponding to 0% in FIG. 3, only fresh air is supplied into the vehicle passenger compartment. If the temperature switch 58 is set to maximum heating "max" (100% in FIG. 3), the maximum proportion of recirculated air is admixed. Between 0 and 80%, i.e., at relatively low heater output, exclusively fresh air is introduced, and only at high heater outputs of between 80 and 100% is the proportion of recirculated air continuously increased, for example in accordance with a curve 70 in FIG. 3. This regulation enables, in particular in the cold-starting mode, the vehicle passenger compartment to be rapidly heated, and after the cold-starting phase, when the full heater output is no longer required, the vehicle passenger compartment is dehumidified again by supplying exclusively fresh air. For the sake of completeness, FIG. 3 also shows two curves 72 and 74, which represent the heating of the air (72) supplied to the footwell or defrost vents and the air (74) supplied to the central vents.

Figure 4:
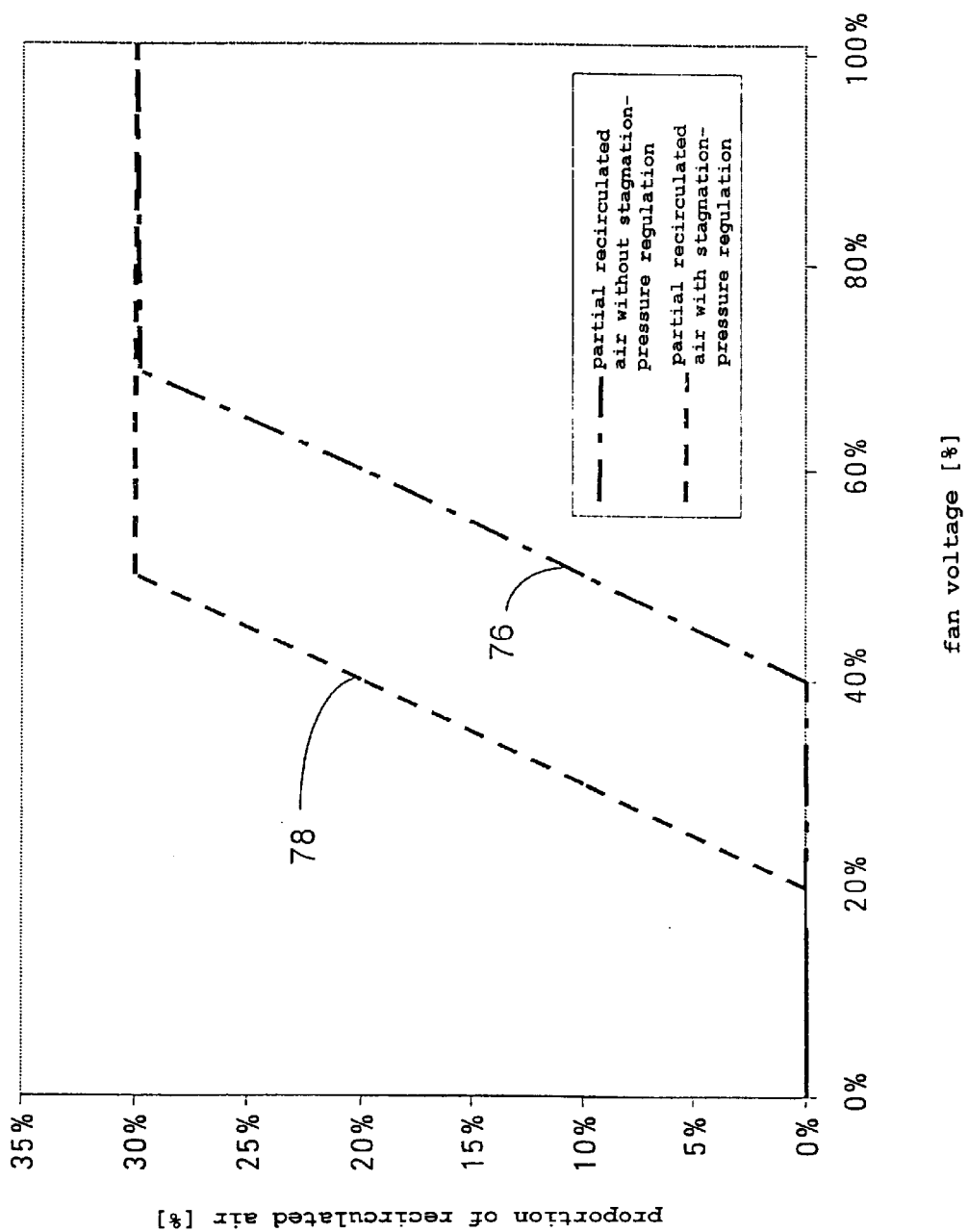

In a further embodiment of the invention, the proportion of recirculated air can also be regulated as a function of the fan output. No recirculated air is admixed at a low fan output, for example, of between 0 and 40%, with the result that, in this case, fresh air cannot penetrate via the recirculated-air duct into the vehicle interior during the journey, as a result of the stagnation pressure in the fresh-air duct. At a higher fan output, for example, of between 40 and 70%, the proportion of recirculated air is varied, preferably continuously in accordance with the dash-dotted line 76 (FIG. 4), up to a maximum value (30%), after which the fan output remains constant. If a means of regulating the stagnation pressure, for example, in the form of a stagnation pressure flap, is provided in the fresh air supply, some recirculated air can be added even at a low fan output of, for example, 20%, in accordance with the dashed curve 78.

Since the stagnation pressure is dependent on the driving speed, the proportion of recirculated air can advantageously also be regulated as a function of the speed. At low speed, and therefore low stagnation pressure, some circulated air can be admixed even at a relatively low fan output, for example, of <20%.

The foregoing description of preferred embodiments of the invention has been presented for purposes of illustration and description only. It is not intended to be exhaustive or to limit the invention to the precise form disclosed, and modifications and variations are possible and/or would be apparent in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto and that the claims encompass the disclosed embodiments and their equivalents.

What is claimed is:

1. A method for regulating air mixing in a heating and/or air-conditioning system of a motor vehicle having a passenger compartment, comprising:
   supplying at least one of recirculated air and fresh air to an air-guiding housing;
   conditioning the supplied air in the housing;
   distributing conditioned air to different locations in the passenger compartment by means of at least one air-flow control element; and
   controlling the proportion of recirculated air supplied primarily as a function of the position of said at least one air-flow control element.

2. A method as claimed in claim 1, wherein, only in a defrost mode, in which most of the conditioned air is guided onto a windshield, exclusively fresh air is supplied.

3. A method as claimed in claim 1, wherein a maximum proportion of recirculated air is defined as a function of at least one parameter.

4. A method as claimed in claim 3, wherein said parameter comprises the number of vehicle occupants.

5. A method as claimed in claim 1, further comprising controlling the proportion of recirculated air as a function of heater output of the heating and/or air-conditioning system.

6. A method as claimed in claim 5, wherein only above approximately 80% of the maximum heater output is recirculated air supplied.

7. A method as claimed in claim 6, wherein a maximum proportion of recirculated air is supplied at maximum heater output.

8. A method as claimed in claim 1, further comprising controlling the proportion of recirculated air as a function of the fan output of the heating and/or air-conditioning system.

9. A method as claimed in claim 8, wherein no proportion of recirculated air is supplied at a small fan output, and as the fan output increases a higher proportion of recirculated air is supplied.

10. A method as claimed in claim 8, further comprising controlling the proportion of recirculated air supplied as a function of vehicle driving speed.

11. An arrangement for regulating air mixing in a heating and/or air-conditioning system of a motor vehicle having a passenger compartment, comprising:
    an air-guiding housing having at least one recirculated-air intake opening and at least one fresh-air intake opening;
    an intake air control element for selectively supplying at least one of recirculated air and fresh air to the housing;
    a fan and at least one heat exchanger positioned in the housing for conditioning the supplied air;
    a plurality of distributing air-flow control elements for distributing conditioned air from the housing to different locations in the passenger compartment; and
    a control unit for controlling the proportion of recirculated air supplied by the intake air-flow control element as a function of the position of at least one of the distribution air-flow control elements.

12. A method for regulating air mixing in a heating and/or air-conditioning system of a motor vehicle having a passenger compartment, comprising:

supplying at least one of recirculated air and fresh air to an air-guiding housing;

conditioning the supplied air in the housing;

distributing conditioned air to different locations in the passenger compartment by means of at least one air-flow control element; and controlling the proportion of recirculated air supplied primarily as a function of the position of said at least one air-flow control element.

13. A method as claimed in claim 12, wherein the proportion of recirculated air is controlled in response to a signal that consists essentially of a signal indicative of the position of said at least one air control element.

14. An arrangement for regulating air mixing in a heating and/or air-conditioning system of a motor vehicle having a passenger compartment, comprising:

an air-guiding housing having at least one recirculated-air intake opening and at least one fresh-air intake opening;

an intake air control element for selectively supplying at least one of recirculated air and fresh air to the housing;

a fan and at least one heat exchanger positioned in the housing for conditioning the supplied air;

a plurality of distributing air-flow control elements for distributing conditioned air from the housing to different locations in the passenger compartment; and a control unit for controlling the proportion of recirculated air supplied by the intake air- flow control element primarily as a function of the position of at least one of the distribution air-flow control elements.

15. An arrangement as claimed in claim 14, further comprising a first signal generator generating a signal indicative of the position of at least one of said distributing air-flow control elements, and wherein said flow control unit is responsive to a signal that consists essentially of the signal from said first signal generator.

16. An arrangement as claimed in claim 14, consisting essentially of the recited elements.

* * * * *